(12) United States Patent
Cachat et al.

(10) Patent No.: US 7,200,448 B2
(45) Date of Patent: Apr. 3, 2007

(54) SYSTEM AND METHOD FOR FUNCTION BLOCK EXECUTION ORDER GENERATION

(75) Inventors: Anthony J. Cachat, Hudson, OH (US); Unni M. Heineking, Chardon, OH (US); Michael Silvestro, Twinsburg, OH (US); Jacob S. Baker, Rocky River, OH (US); Holly E. Johnson, Elyria, OH (US); Douglas J. Reichard, Fairview Park, OH (US); Carol A. Knez, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 678 days.

(21) Appl. No.: 10/020,157

(22) Filed: Dec. 7, 2001

(65) Prior Publication Data

US 2003/0100958 A1 May 29, 2003

Related U.S. Application Data

(60) Provisional application No. 60/333,576, filed on Nov. 27, 2001.

(51) Int. Cl.
| | |
|---|---|
| G05B 11/01 | (2006.01) |
| G05B 15/00 | (2006.01) |
| G05B 19/42 | (2006.01) |
| G06F 9/44 | (2006.01) |
| G06F 3/00 | (2006.01) |
| G06F 9/00 | (2006.01) |
| G06F 17/00 | (2006.01) |

(52) U.S. Cl. ............................ 700/18; 700/17; 700/83; 700/86; 717/109; 715/762; 715/763; 715/781; 715/782

(58) Field of Classification Search ............... 700/17, 700/18, 83, 86
See application file for complete search history.

(56) References Cited

U.S. PATENT DOCUMENTS

| 5,847,953 | A | 12/1998 | Sojoodi et al. |
| 5,971,581 | A * | 10/1999 | Gretta et al. .................. 700/83 |
| 6,064,816 | A | 5/2000 | Parthasarathy et al. |
| 6,095,674 | A | 8/2000 | Verissimo et al. |
| 6,173,208 | B1 | 1/2001 | Park et al. .................... 700/83 |
| 6,195,591 | B1 | 2/2001 | Nixon et al. .................. 700/83 |
| 6,931,288 | B1 * | 8/2005 | Lee et al. ..................... 700/86 |

OTHER PUBLICATIONS

European Search Report, 02025899.2-2206-, mailed Nov. 11, 2004.

* cited by examiner

Primary Examiner—Anthony Knight
Assistant Examiner—Ronald D. Hartman, Jr.
(74) Attorney, Agent, or Firm—Amin Turocy & Calvin LLP; R. Scott Speroff (57) ABSTRACT

Methods and systems are disclosed for automatically generating an execution order for a control system function block diagram. The input data availability is determined for the inputs of the function blocks in the diagram, and an execution order is generated for the function block diagram according to the input data availability for the function block inputs. Also disclosed are methods and systems for generating a control routine from a function block diagram having a plurality of function blocks, wherein the control routine is generated from the function block diagram according to the execution order.

18 Claims, 8 Drawing Sheets

SYSTEM AND METHOD FOR FUNCTION BLOCK EXECUTION ORDER GENERATION

CROSS REFERENCE TO RELATED APPLICATIONS

The present application claims the benefit of U.S. Provisional Patent Application Ser. No. 60/333,576, filed Nov. 27, 2001, entitled SYSTEM AND METHOD FOR FUNCTION BLOCK EXECUTION ORDER GENERATION.

TECHNICAL FIELD

The present invention relates to the art of industrial control systems, and more particularly to systems and methods for function block execution order generation.

BACKGROUND OF THE INVENTION

Industrial controllers are special purpose processing devices used for controlling industrial processes, machines, manufacturing equipment, and other factory automation applications. In accordance with a control program or routine, an industrial controller may measure one or more process variables or inputs representative of the status of a controlled process, and change outputs effecting control of the process. The inputs and outputs may be binary, (e.g., on or off), and/or analog assuming a continuous range of values. The control routine may be executed in a series of execution cycles with batch processing capabilities, and may comprise one or more functional units. Such a control routine may be created in a controller configuration system having tools and interfaces whereby a user may implement a control strategy using programming languages or graphical representations of control functionality, sometimes referred to as function blocks. The control routine may be downloaded from the configuration system into one or more controllers for implementation of the control strategy in controlling a process or machine.

The measured inputs received from a controlled process and the outputs transmitted to the process may pass through one or more input/output (I/O) modules in a control system, which serve as an electrical interface between the controller and the controlled process, and may be located proximate or remote from the controller. The inputs and outputs may be recorded in an I/O table in processor memory. Input values may be asynchronously read from the controlled process by one or more input modules and output values may be written directly to the I/O table by a processor for subsequent communication to the process by specialized communications circuitry. An output module may interface directly with a controlled process, by providing an output from an I/O table to an actuator such as a motor, valve, solenoid, and the like.

During execution of the control routine, values of the inputs and outputs exchanged with the controlled process pass through the I/O table. The values of inputs in the I/O table may be asynchronously updated from the controlled process by dedicated scanning circuitry. This scanning circuitry may communicate with input and/or output modules over a bus on a backplane or network communications. The scanning circuitry may also asynchronously write values of the outputs in the I/O table to the controlled process. The output values from the I/O table may then be communicated to one or more output modules for interfacing with the process. Thus, a controller processor may simply access the I/O table rather than needing to communicate directly with the controlled process.

In distributed control systems, controller hardware configuration may be facilitated by separating the industrial controller into a number of control modules, each of which performs a different function. Particular control modules needed for the control task may then be connected together on a common backplane within a rack and/or through a network or other communications medium. The control modules may include processors, power supplies, network communication modules, and I/O modules exchanging input and output signals directly with the controlled process. Data may be exchanged between modules using a backplane communications bus, which may be serial or parallel, or via a network. In addition to performing I/O operations based solely on network communications, smart modules exist which may execute autonomous logical or other control programs or routines.

Various control modules of a distributed industrial control system may be spatially distributed along a common communication link in several racks. Certain I/O modules may thus be located proximate a portion of the control equipment, and away from the remainder of the controller. Data may be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values may be used by a processor (e.g., a PLC) for performing control computations.

An industrial controller may be customized to a particular process by writing one or more control software routines that may be stored in the controller's memory and/or by changing the hardware configuration of the controller to match the control task or strategy. Such control routines may be generated using controller configurations systems or tools, which facilitate translation of a desired control strategy for the process into a control routine executable in a controller. Conventional configuration tools provide for graphical representations of control functions known as function blocks. A user models a control strategy by placing function blocks in a user interface work surface, and associating the function blocks using graphical connections known as wires, via a graphical user interface. Once the user has thus defined the desired control strategy, the configuration system compiles or verifies the graphical representation to produce a control routine, which may then be downloaded to one or more control modules in the control system. The control functions represented by the function blocks are implemented in the verified control routine according to execution ordering which may be determined in the compilation or verification process in the configuration tool.

Existing controller configuration tools allow a user to manually specify the execution ordering of the function blocks. For instance, the user may assign an order number to each function block using a control configuration system user interface. The compiled control routine will then perform the functionality underlying the function blocks in the assigned execution order. However, the manual ordering of function blocks may cause data latency or other data flow problems, for example, where a user assigns execution order numbers to function blocks in an illogical manner. Another disadvantage to manual execution order assignment is that subsequent changes to the control strategy, such as where new function blocks are added, may require manual reordering of existing function blocks in order to achieve proper or desired data flow.

Some conventional control system configuration tools provide for automated function block execution order generation based on the location of function blocks in the user interface. For example, the user may drag and drop graphical representations of the function blocks onto a work surface or work space in a graphical user interface. The associations between various function blocks may then be established by connecting outputs and inputs of the function blocks using wires or other connectors in the interface. These prior systems then assign execution ordering for the function blocks according to vertical and/or horizontal positioning of the function block representations in the interface work surface. For instance, execution ordering may be done from left to right, and top to bottom, wherein function blocks near the top left of the work space are executed before those near the bottom or right portions thereof. However, the execution ordering based on function block location in a work space is prone to data flow problems, particularly where the user does not position the function blocks with an eye toward data flow during execution of the resulting control routine. Thus, there is a need for improved methods and configuration tools by which data flow problems are reduced or minimized in creating control routines for industrial control systems.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later. The invention provides methods and configuration systems by which the difficulties and disadvantages associated with manual function block ordering are eliminated or reduced. The invention further provides for improved data flow in control system routine execution, which allows the user to position function blocks in any position in a control system configuration system interface work surface, without adversely affecting data flow in the resulting control routine.

According to one aspect of the invention, a method is provided for generating an execution order for a function block diagram having a plurality of function blocks, wherein the function blocks each have one or more inputs. The method may be employed, for example, in a controller configuration system or tool, which translates or converts a function block diagram into a control program or routine for execution in a controller. The method comprises determining input data availability for the inputs of the plurality of function blocks, and generating an execution order for the function block diagram according to the input data availability for the inputs of the plurality of function blocks in the function block diagram. The invention thus provides for automatic function block execution ordering, which takes into account the availability of input data, whereby data flow problems are minimized or reduced. Moreover, the invention eliminates errors associated with manual execution ordering, and allows the user to focus on designing control strategies, rather than worrying about the location of function blocks in a function block diagram.

The invention advantageously detects feedback loops in the function block diagram, and selectively assumes input data availability for function blocks in the feedback loop. Thus, an execution order determination may be made in a deterministic manner, even in the presence of such loops. Such feedback loops may be detected by the existence of a feedback loop indicia in the function block diagram, such as a localized feedback wire associated with a function block input in the feedback loop. In this case, input data may be assumed for function block input or inputs associated with the localized feedback wire. The method may further detect unspecified feedback loops in the function block diagram and generate a corresponding error, for instance, where no localized feedback wire exists in a feedback loop. The presence of incorrect or extra localized feedback wires in the function block diagram may also be ascertained, along with generation of appropriate errors.

The generation of an execution order may be accomplished for the function block diagram via assigning an execution number to each of the function blocks in the function block diagram. This may be done in recursive fashion, for example, wherein the method traverses the function block diagram and determines the data availability associated with the function block inputs. For instance, where the function block diagram includes an association between an input of a first function block and an output of a second function block, the method may determine that data is available for the input of the first function block if an execution order number has been assigned to the second function block. Data may also be determined as available where the function block input is associated with an input reference. Once data has been determined as available for all inputs of a function block, the method may assign the next available execution order number to the function block, and proceed to process other function blocks accordingly.

According to another aspect of the invention, a method is provided for generating a control routine from a function block diagram, which may be employed in a controller configuration tool or system. The method comprises determining input data availability for the inputs of the function blocks in the diagram, generating an execution order for the function block diagram according to the input data availability for the inputs of the function blocks, and generating a control routine from the function block diagram according to the execution order.

A further aspect of the invention provides a controller configuration system for generating a control routine from a function block diagram. The system may comprise an execution order generator component adapted to determine input data availability for the inputs of the plurality of function blocks, and to generate an execution order for the function block diagram according to the input data availability for the inputs of the function blocks. The system may further comprise a compiler component adapted to generate a control routine from the function block diagram according to the execution order. The invention further comprises an execution order generator for generating an execution order for a function block diagram, which comprises means for determining input data availability for the inputs of the function blocks, and means for generating an execution order for the function block diagram according to the input data availability for the inputs of the function blocks.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The various aspects of the present invention will now be described with reference to the drawings, wherein like reference numerals are used to refer to like elements throughout. The invention provides methods and systems for automatically generating an execution order for a control system function block diagram according to function block input data availability. The input data availability is determined for inputs of the function blocks in the diagram, and an execution order is generated for the function block diagram according to the input data availability for the function block inputs. The invention further includes methods and systems for generating a control routine from a function block diagram having a plurality of function blocks, wherein the control routine is generated from the function block diagram according to the execution order.

Figure 1:
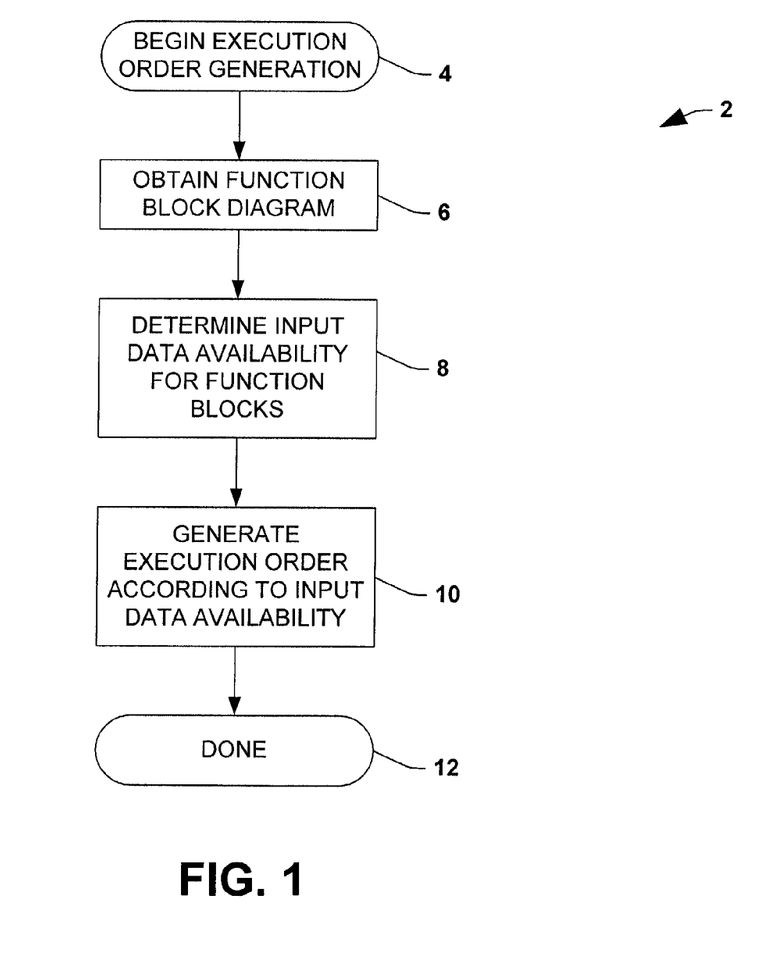
FIG. 1 is a flow diagram illustrating an exemplary method of generating a function block execution order in accordance with an aspect of the present invention.

Referring now to the drawings, FIG. 1 illustrates an exemplary method 2 for generating an execution order for a function block diagram in accordance with an aspect of the invention. While the exemplary method 2 is illustrated and described herein as a series of acts or events, it will be appreciated that the present invention is not limited by the illustrated ordering of acts, as some acts may occur in different orders and/or concurrently with other acts apart from that shown and described herein, in accordance with the invention. In addition, not all illustrated acts may be required to implement a methodology in accordance with the present invention. The method 2 may find utility in association with controller configuration tools and other systems illustrated and described in greater detail herein. However, it will be appreciated that the exemplary method 2, as well as other methodologies according to the invention, may be implemented in association with the apparatus and systems illustrated and described herein as well as in association with other systems not illustrated.

Beginning at 4, a function block diagram (not shown) is obtained at 6. The availability of input data for the function blocks in the function block diagram is determined at 8. Once the input data availability has been determined for the function blocks in the diagram, an execution order is generated at 10, after which the method 2 ends at 12. The determination of input data availability at 8 may comprise, for example, determining sources for the data associated with the inputs to each function block in the function block diagram, determining whether the input data source is an input reference (e.g., data obtained from a controlled process or machine), determining whether the input source is part of a feedback loop, and the like, in order to discern whether an execution number should be assigned to a function block at 10. The function blocks may thus be evaluated one at a time, until an input source function block is found which is dependent only upon an input reference (e.g., for which data availability may be assumed). The identified function block may then be assigned the next available execution order number as part of the execution order generation at 10, whereupon the process continues until order numbers have been assigned for each such function block.

The method 2 thus contemplates iterative evaluation of one or more function blocks in order to ascertain function blocks which depend only upon known (e.g., or assumed) available input data. It will be noted, in this regard, that the first function block thus evaluated may be selected according to any appropriate criteria, and that the method 2 will generate an execution order according to data availability regardless of which function block is evaluated first. Once a function block has been assigned an execution order number, the data provided thereby may thereafter be assumed in the method 2 to be available. Thus, the evaluation of data availability may comprise determination of whether the input or inputs associated with a function block are dependent upon (e.g., sourced from) an input reference (e.g., a known available data value) or from another function block within the function block diagram which has been assigned an execution order number. The method 2 may thus proceed recursively through 8 and 10 until execution order numbers have been assigned to each function block.

The execution order thus obtained is therefore generated according to the availability of function block input data, rather than according to function block position on a controller configuration system interface work surface, or according to manual ordering performed by a user. The invention thus allows the user to focus on creating proper control relationships in designing a function block diagram, without having to position function blocks within a diagram according to some spatial interpretation rules (e.g., top to bottom, left to right, etc.) in order to ensure proper data flow. This feature of the invention allows the user to locate function blocks spatially within the diagram according to other preferences, such as according to functional interrelationship therebetween, or according to readability or other preferences. In this regard, the automatic generation of function block execution order via the exemplary method 2 does not require the user to understand or scrutinize the control strategy for data flow purposes. Rather, proper data flow is ensured by the resulting execution order according to the data dependencies (e.g., availability of input data) of the user's control strategy as embodied in the function block diagram.

The method 2 may further take into account feedback loops and other recursive data dependency characteristics of the control strategy in the data availability determination at 8 and the execution order generation at 10. For instance, the determination of data availability at 8 may comprise determining that a feedback loop exists in the function block diagram, and assuming data availability for function blocks in the feedback loop. In this manner, the invention provides for deterministic evaluation of data dependencies in generating a function block execution order. For example, a feedback loop may be identified via a localized feedback wire (e.g., or other feedback loop indicia in the function block diagram) associated with a function block input in the feedback loop. In this regard, the method 2 at 8 may assume data availability for the function block input associated with the localized feedback wire.

Figure 2:
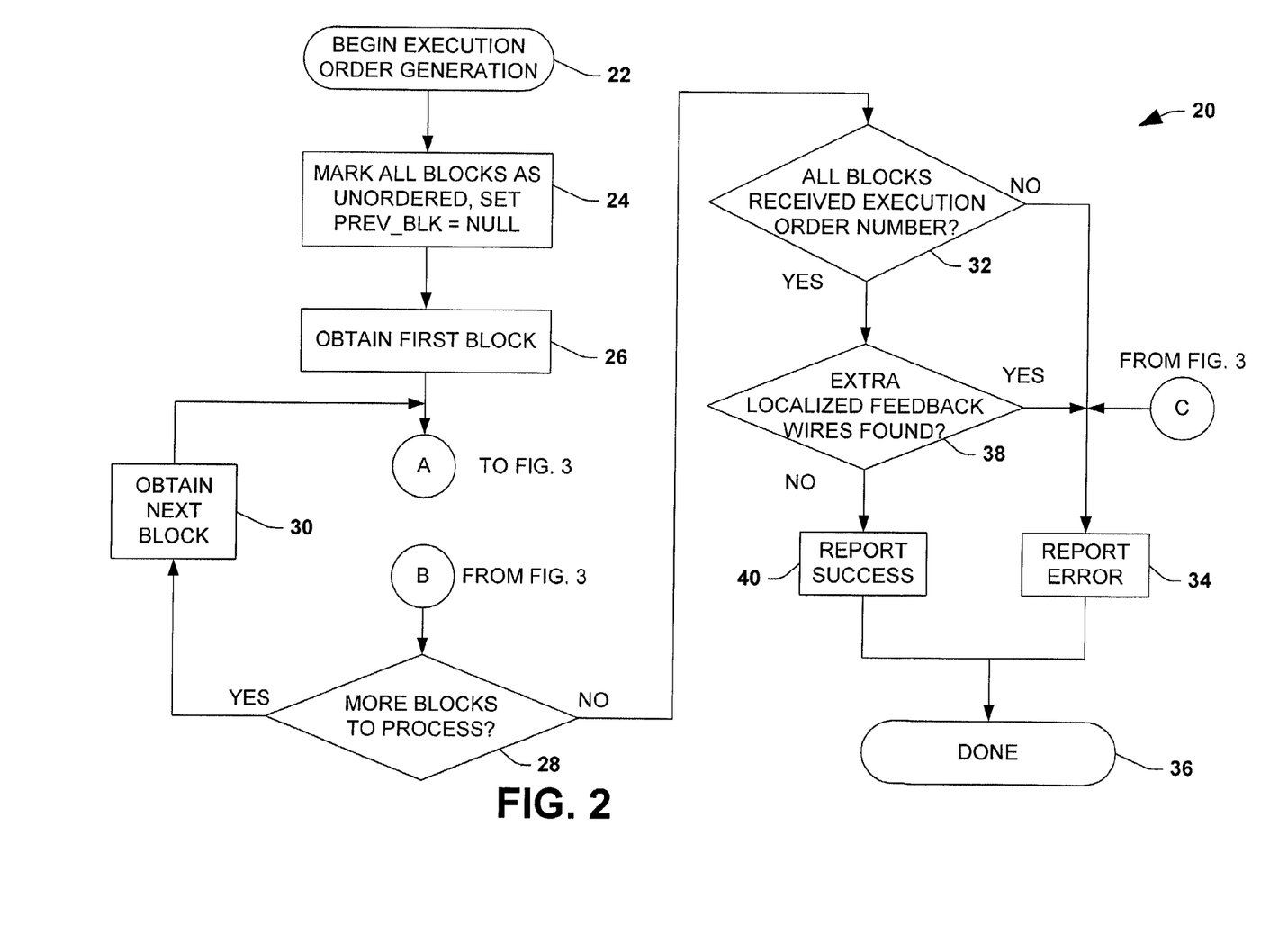
FIG. 2 is a flow diagram illustrating another exemplary method of generating a function block execution order in accordance with the invention.
Figure 3:
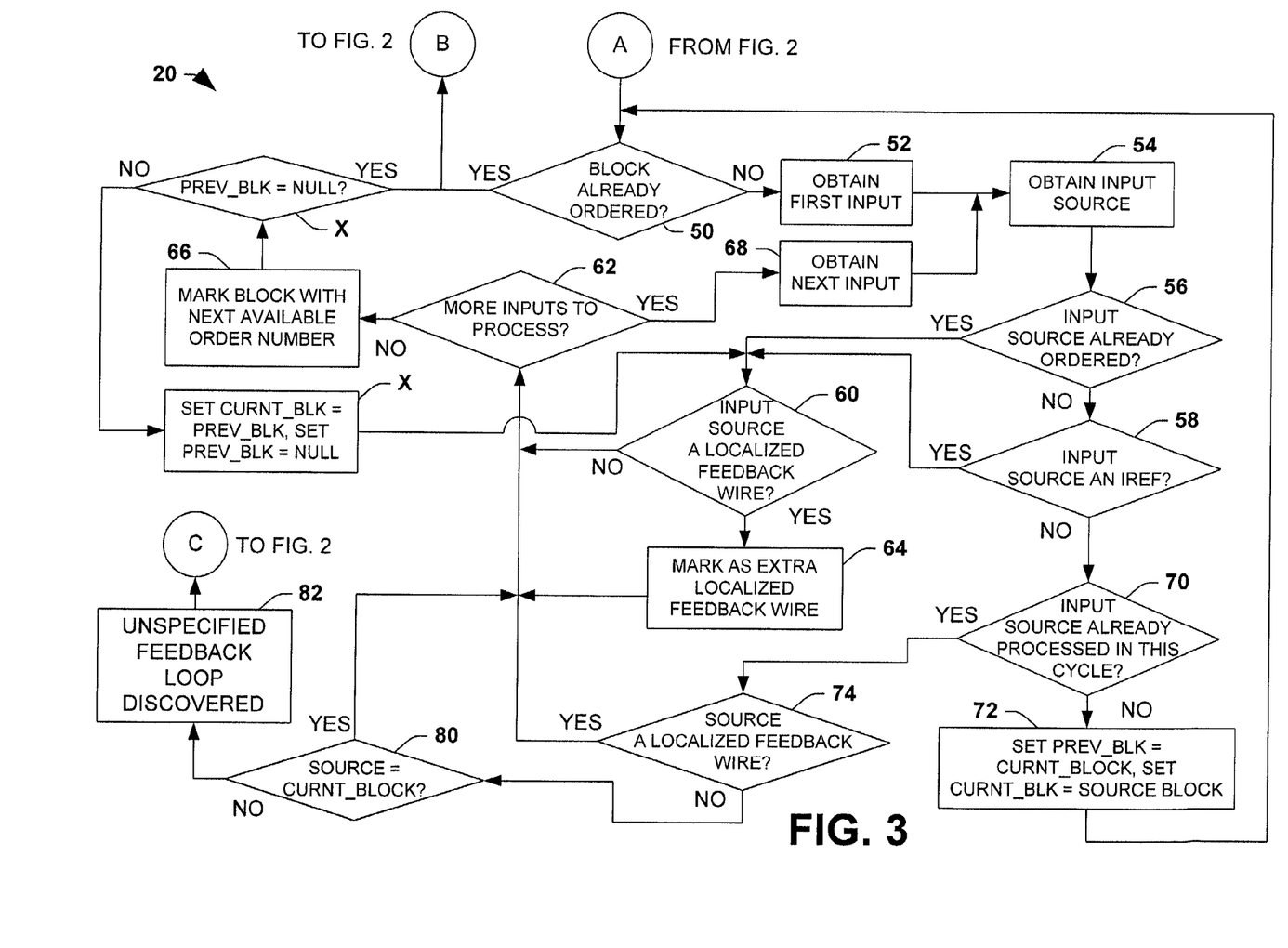
FIG. 3 is a flow diagram further illustrating the method of FIG. 2.

In FIGS. 2 and 3, another exemplary method 20 is illustrated for generating a function block execution order in accordance with the invention. While the exemplary method 20 is illustrated and described herein as a series of acts or events, it will be appreciated that the present invention is not limited by the illustrated ordering of acts, as some acts may occur in different orders and/or concurrently with other acts apart from that shown and described herein, in accordance with the invention. In addition, not all illustrated acts may be required to implement a methodology in accordance with the present invention. The method 20 may be employed in association with controller configuration tools and other systems illustrated and described in greater detail herein. However, it will be appreciated that the exemplary method 20, as well as other methodologies according to the invention, may be implemented in association with the apparatus and systems illustrated and described herein as well as in association with other systems not illustrated.

Beginning at 22, the method 20 comprises marking all function blocks in a function block diagram as unordered, and setting PREV_BLK to NULL at 24, whereafter a first block is obtained at 26. As with the exemplary method 2 illustrated and described above with respect to FIG. 1, the method 20 is not dependent upon which function block is initially selected or obtained at 26, and thus, the first block may be selected at 26 according to any appropriate criteria. The method 20 then proceeds to 50 (e.g., FIG. 3) whereat block ordering is performed (e.g., assignment of execution order numbers to function blocks) with respect to the function block obtained at 26 (e.g., and/or blocks associated therewith), as illustrated and described in greater detail hereinafter. Upon return from the acts and events illustrated in FIG. 3, the method 20 proceeds to 28 in FIG. 2, whereat a determination is made as to whether more function blocks remain to be processed. If so, the next such block is obtained at 30, and the method 20 returns to 50 (e.g., FIG. 3).

If no other function blocks remain to be processed at 28, a determination is made at 32 as to whether all the function blocks in the function block diagram have been assigned order numbers. If not (e.g., all function blocks processed, but not all have execution order numbers), an error may be reported at 34, and the method ends at 36. Otherwise, a determination is made at 38 as to whether any unnecessary or extra localized feedback wires have been found. If so, an error is reported at 34. Otherwise, the execution ordering is reported as successful at 40, and the method 20 ends at 36.

As illustrated in FIG. 3, at 50, a determination is made as to whether the current function block has already been ordered (e.g., an execution number has already been assigned to the current block). If so, the method 20 returns to 28 (e.g., FIG. 2) and the next unprocessed function block (e.g., if any at 28) is obtained at 30. If the current block has not thus far been ordered at 50, the input(s) of the current block are evaluated. A first such input (e.g., an input for the current function block) is obtained at 52, and the source of the input is obtained at 54. A determination is made at 56 as to whether the input source (e.g., another function block) has already been ordered (e.g., an execution order number has been assigned to the source function block). If not, a determination is made at 58 as to whether the input source is an input reference (e.g., IREF). An input reference may comprise, for example, an association between the function block input of interest and a value assumed to be available for purposes of the input data availability determination. For instance, the input source may be associated with a hardware input value from a controlled process or machine, whereby an input value therefrom may be assumed to be available.

If the input source has already been ordered at (e.g., YES at 56), or if the input source is an input reference (e.g., YES at 58), the method 20 proceeds to 60, whereat a determination is made as to whether the input source is a localized feedback wire or other indicia in the function block diagram indicating that the input data may be assumed to be available. A localized feedback wire may be employed, for example, by a user in associating the function block input with another block output, where the user acknowledges that a feedback loop in the control strategy includes the function block input. It will be appreciated at this point that the determinations at 56 and 58 may be made in any order or contemporaneously in accordance with the invention.

If the input source is determined not to be a localized feedback wire at 60, the method 20 proceeds to 62. If however, the input source at 60 is a localized feedback wire, the input source (e.g., or the localized feedback wire associated therewith) is marked as extra or unnecessary at 64, whereafter the method 20 proceeds to 62. At 62, a determination is made as to whether more inputs remain to be processed for the current function block. If not, the current function block is ordered at 66 and a determination is made at 67 as to whether PREV_BLK is set to NULL. If so, the method 20 returns to 28 and 30 (FIG. 2) for processing of any remaining function blocks. In this regard, the ordering of the current function block at 66 may comprise marking the current block with the next available execution order number. If more inputs remain to be processed for the current function block at 62, the next input is obtained at 68, and the input source associated therewith is obtained at 54 as described above.

Where the input source for the input of interest for the current function block has not already been ordered (e.g., NO at 56), and is not an input reference (e.g., NO at 58), a determination is made at 70 as to whether the input source was already processed in the current cycle. If not, PREV_BLK is set to the current block (e.g., set to CURNT_BLK), and the current block is set to the source block (e.g., CURNT_BLK set to SOURCE BLOCK) at 72. Thus, the function block associated with the unprocessed input source (e.g., the source block) is obtained at 72, and the method 20 proceeds to process the source block at 50 as illustrated and described above. Where the source block is eventually ordered at 66, a determination is made at 67 as to whether PREV_BLK is NULL. At this point, PREV_BLK is no longer NULL (e.g., having been set at 72), whereby the method 20 proceeds to 73, whereat CURNT_BLK is set to PREV_BLK and PREV_BLK is reset to NULL. In this fashion, the method 20 recursively processes connected or associated function blocks until one of the blocks is ordered, and then returns to finish ordering of the blocks previously scrutinized. In this regard, it will be appreciated that PREV_BLK may be a variable whose value is associated with a stack in memory, whereby any number of block numbers may be pushed and popped onto and off of the stack in order to achieve the recursion of the method 20.

Referring again to 70, where the input source has been previously processed in the current cycle, a determination is made at 74 as to whether the source is a localized feedback wire. If so, the method 20 proceeds to 62 where a determination is made as to whether more inputs remain to be processed as described above. In this case, the method 20 assumes the availability of the input data for the current function block input, whereby the execution ordering may proceed accordingly. If the input source at 74 is not a localized feedback wire, the method 20 proceeds to 80, where a determination is made as to whether the source is the current function block. If so, the method 20 proceeds to 62 as described above. If not, an unspecified feedback loop is identified at 82, whereafter the method proceeds to report an error at 34 (e.g., FIG. 2), as described above.

The exemplary method 20 thus generates an execution order for a function block diagram having a plurality of function blocks, wherein the function blocks each have one or more inputs, by determining input data availability for the inputs of the blocks, and generating an execution order for the function block diagram according to the input data availability. The input data availability determination may comprise determining if a feedback loop exists in the function block diagram, and assuming data availability for function blocks in the feedback loop. The existence of feedback loops in this regard may be determined by the presence of a localized feedback wire associated with a function block input. The method 20 further determines whether an unspecified feedback loop and/or an extra (e.g., unnecessary) localized feedback wire exists in the function block diagram, and generates an appropriate error. The method 20, moreover, is adapted to assign an execution order number to a function block if all input data sources are input references or emanate from previously ordered blocks.

Figure 4:
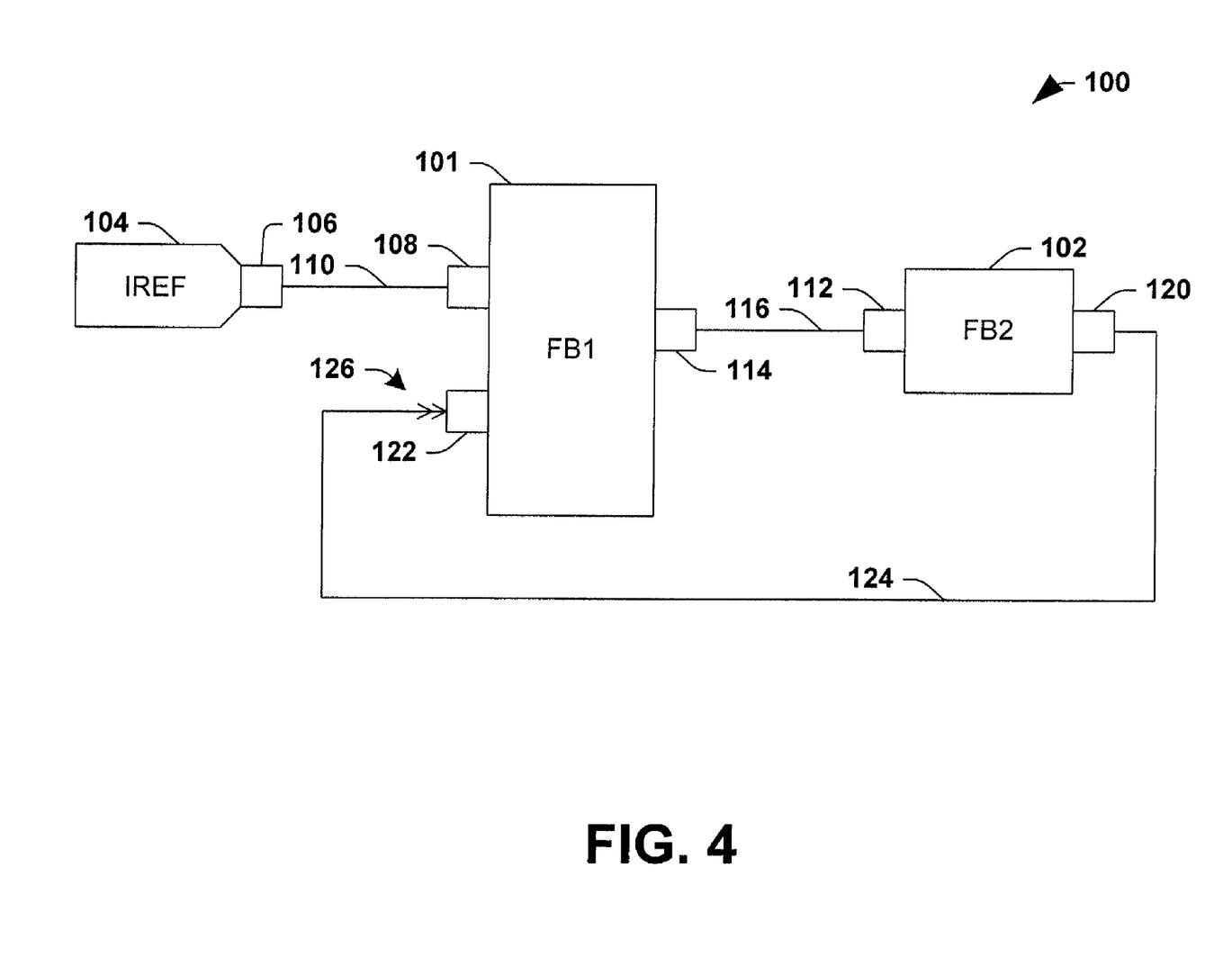
FIG. 4 is a schematic diagram illustrating a feedback loop in a function block diagram.

In order to provide further illustration of various aspects of the invention, an example portion of a function block diagram 100 is shown in FIG. 4, having function blocks FB1 101 and FB2 102, with associations (e.g., wires) therebetween providing a desired functional interrelationship between the function blocks 101 and 102, as well as an input reference 104. Associations between the function blocks 101, 102 and the input reference 104 are established using wires, for example, wherein an output 106 of the input reference 104 is associated with a first input 108 of function block 101 by a wire 110, and an input 112 of function block 102 is associated with an output 114 of function block 101 via a wire 116. An output 120 of the function block 102 is associated with a second input 122 of function block 101 via a localized feedback wire 124, which is graphically denoted by a double arrow indicia 126 at the input 122.

The function block diagram 100 thus includes a feedback loop comprising output 120, localized feedback wire 124, input 122, output 114, wire 116, and input 112. The diagram 100 may be ordered for execution in accordance with the exemplary method 20 of FIGS. 2 and 3 as described below, whereby input data availability is determined for the function blocks 101 and 102 therein, and an execution order is generated according to the input data availability. In reference to FIGS. 2, 3, and 4, for instance, the function blocks 101 and 102 are initially marked as unordered, and PREV_BLK is set to NULL at 24, after which a first block is obtained at 26. For purposes of illustration, it is assumed that function block 102 is selected first, although the method 20 operates independent of which block is initially selected in generating a proper execution order.

At 50, it is determined that the current block (e.g., function block 102) has not previously been ordered (e.g., no execution order number has been assigned to block 102). The sole input 112 for the current block 102 is obtained at 52, and the input data source therefor (e.g., output 114 of function block 101) is obtained at 54. Thereafter at 56 and 58, determinations are made that the input source 114 (e.g., and the function block 101 associated therewith) has not been ordered and is not an input reference. The method 20 accordingly proceeds to 70 whereat it is determined that the input source 114 has not been previously processed, after which the method 20 sets PREV_BLK to CURNT_BLK (e.g., block 102), and sets CURNT_BLK to SOURCE BLOCK (e.g., block 101) at 72, and returns to 50.

At 50, it is determined that the function block 101 has not been previously ordered (e.g., no execution order number has been assigned thereto) and the first input 108 of the block 101 is obtained at 52. The source (e.g., input reference 104) for the input 108 is obtained at 54, and a determination is made at 56 that the input source 104 has not been ordered. However, at 58, it is determined that the input source 104 is an input reference (e.g., which may indicate, for example, a value obtained from a hardware input in a controlled process or machine). Accordingly, the method 20 proceeds to 60 where it is determined that the input source is not a localized feedback reference, and then to 62 where it is determined that more inputs (e.g., second input 122) remain to be processed for the current function block 101. The next input 122 is thus obtained at 68 and the input source therefor (e.g., output 120 of function block 102, via the localized feedback loop 124) is obtained at 54.

At 56 and 58, determinations are made that the input source 120 (e.g., and its associated function block 102) has not been previously ordered, and that the input source 120 is not an input reference. At 70, it is determined that the input source has already been processed in the current cycle (e.g., since function block 102 was initially selected at 26), and a determination is accordingly made at 74 that the input source is a localized feedback wire (e.g., localized feedback wire 124). The method 20 next proceeds to 62, whereat a determination is made that no more inputs remain to be processed for the current function block 101 (e.g., first and second inputs 108 and 122 having been previously processed), and the current function block 101 is accordingly marked with the next available execution order number at 68. For purposes of illustration, it is assumed that the execution order number "1" is assigned to function block 101. It will be noted at this point, that the employment and detection of the localized feedback wire 124 facilitates a deterministic generation of execution order numbers in the presence of feedback loops in the function block diagram 100.

Thereafter, the method 20 determines at 67 that PREV_BLK is no longer NULL (e.g., having been previously set to indicate block 102 at 72), and accordingly sets CURNT_BLK to PREV_BLK (e.g., to function block 102) and resets PREV_BLK to NULL at 73. With function block 102 now the current block, the method 20 determines that the input source 114 thereof is not a localized feedback wire at 60. Because the input source 114 is not a localized feedback wire at 60, and because no other inputs remain to be processed at 62 for the current block 102, the block 102 is marked with the next available execution order number (e.g., "2" in this example) at 66. It is thereafter determined at 28 (e.g., FIG. 2) that no other function blocks remain to be processed, and the method 20 proceeds through 32, 38, and 40 before the method 20 ends at 36. The method 20 thus generates a proper execution order (e.g., function block 101 executes prior to execution of function block 102), even in the presence of a feedback loop.

Figure 5:
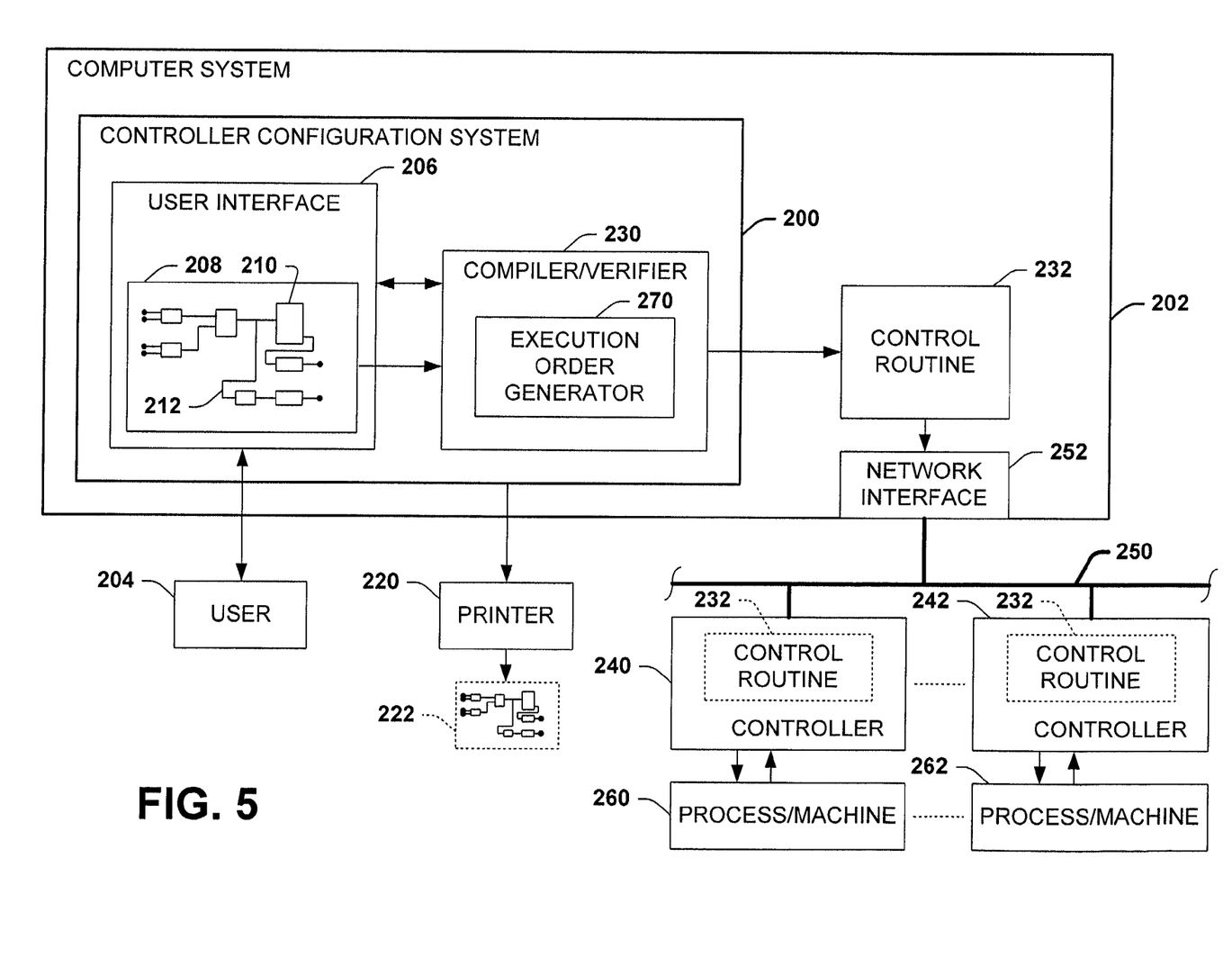
FIG. 5 is a schematic diagram illustrating an exemplary execution order generator in a controller configuration system in accordance with another aspect of the invention.

Referring now to FIG. 5, another aspect of the invention provides an execution order generator for generating an execution order for a function block diagram having a plurality of function blocks, as well as a controller configuration tool or system for generating a control routine from a function block diagram. The execution order generator may be employed as part of such a controller configuration system, and is adapted to determine input data availability for the inputs of the function blocks, and to generate an execution order according to the input data availability. The controller configuration system may comprise an execution order generator component in addition to a compiler component adapted to generate a control routine from the function block diagram according to the execution order.

An exemplary controller configuration tool or system 200 is illustrated in FIG. 5, which may be implemented in software, hardware, and/or combinations thereof, in a computer system 202. A user 204 interacts with the system 200 via a user interface 206, which may be graphical in nature, in order to generate or modify a function block diagram 208 (e.g., or a graphical representation thereof), which may comprise a plurality of function blocks 210 and associations 212 (e.g., wires). The user locates and interconnects the desired function blocks 210 to create a graphical representation of a desired control strategy to be implemented in a control system. The computer system 202 may include output devices such as a printer 220 adapted to provide a printout 222 of the function block diagram 208 for documentation purposes.

The controller configuration system 200 further comprises a compiler or verifier component 230 for generating a compiled or verified control routine or program 232 according to the function block diagram 208. The control routine 232 may then be downloaded to one or more controllers 240, 242, via a network 250 and a network interface 252 in the computer system 202. The downloaded control routine 232 may then be executed in the controller or controllers 240, 242 for controlling the operation of controlled processes or machines 260, 262, respectively.

The controller configuration system 200 further comprises an execution order generator 270 according to an aspect of the invention, which is operative to determine input data availability for the blocks in the diagram 208, and to generate an execution order therefor according to the input data availability. The execution order generation may be accomplished using the generator, as part of the compiler component 230, or separate therefrom. In addition, the compilation and execution order generation may be performed one before the other in any order, or contemporaneously in accordance with the invention. Furthermore, it will be appreciated that the exemplary execution order generator component 270 may operate in accordance with one or more of the exemplary methodologies illustrated and described hereinabove, as well as according to other methods, within the scope of the present invention. The execution order generator and the controller configuration system of the invention advantageously provide for automatic function block execution order generation according to data availability, whereby proper data flow may be achieved in accordance with the present invention.

Exemplary Control System

The methods and systems of the present invention may be employed in association with many forms of control systems. In order to provide context for the various applications in which the aspects of the invention may be carried out, an exemplary control system is now illustrated and described with respect to FIGS. 6 and 7. However, it will be appreciated that the various aspects of the invention may be employed in association with controllers and control systems other than those illustrated and described herein. A distributed industrial control system 310 suitable for use with the present invention provides a first and second rack 312A and 312B for holding a number of functional modules 314 electrically interconnected by backplanes 316A and 316B running along the rear of the racks 312A and 312B respectively. Each module 314 may be individually removed from the rack 312A or 312B thereby disconnecting it from its respective backplane 316 for repair or replacement and to allow custom configuration of the distributed system 310.

Figure 6:
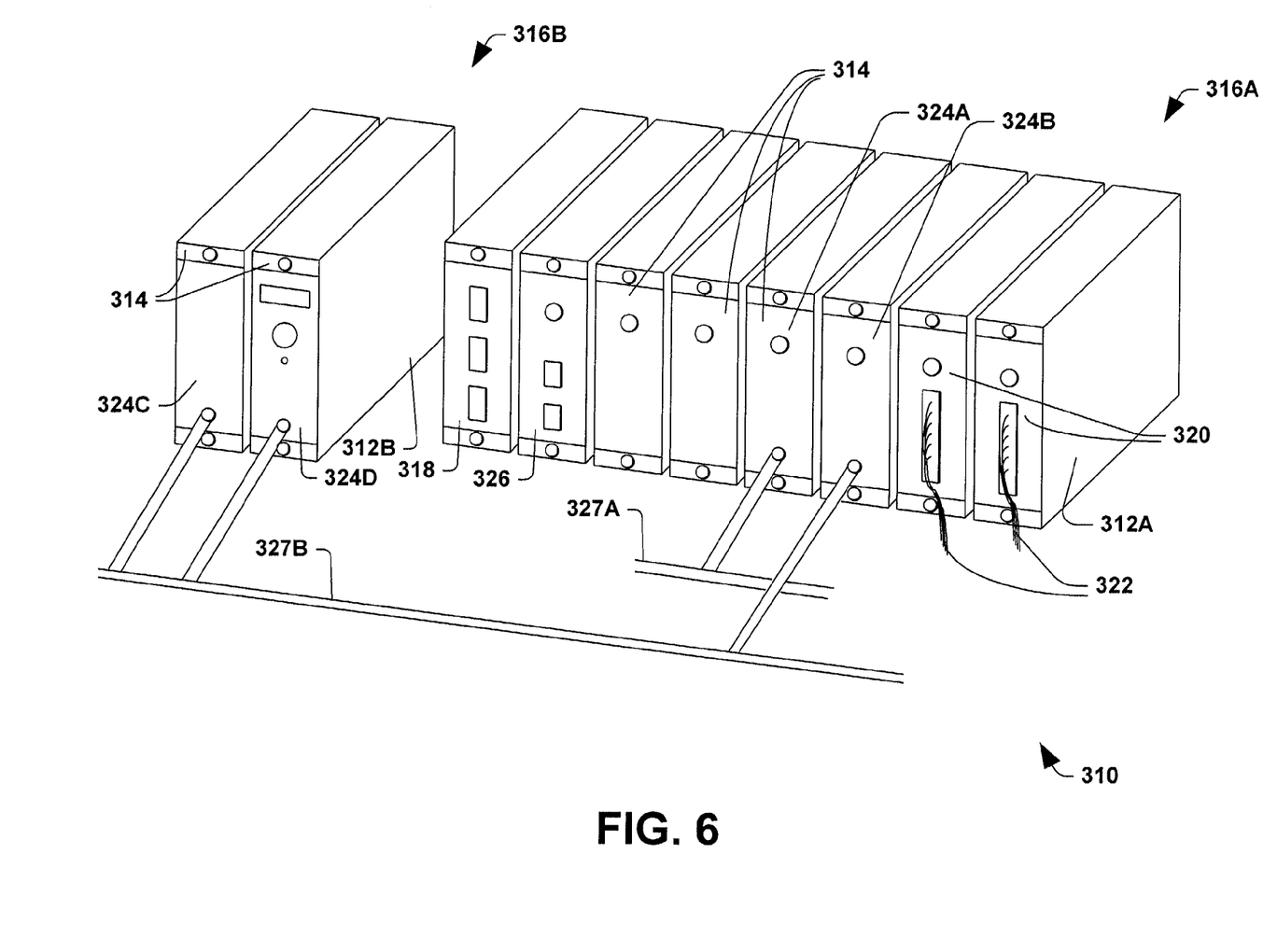
FIG. 6 is a perspective illustration of an industrial controller having multiple functional modules included within several racks joined by communication links.

The modules 314 within the rack 312A may include, for example, a power supply module 318, a processor module 326, two communication modules 324A and 324B and two I/O modules 320. A power supply module 318 receives an external source of power (not shown) and provides regulated voltages to the other modules 314 by means of conductors on the backplane 316A. The I/O modules 320 provide an interface between inputs from, and outputs to external equipment (not shown) via cabling 322 attached to the I/O modules 320 at terminals on their front panels. The I/O modules 320 convert input signals on the cables 322 into digital words for transmission on the backplane 316A. The I/O modules 320 also convert other digital words from the backplane 316A to the necessary signal levels for control of equipment.

The communication modules 324A and 324B provide a similar interface between the backplane 316A and one of two external high speed communication networks 327A and 327B. The high speed communication networks 327A and 327B may connect with other modules 314 or with remote racks of I/O modules 320, controller configuration tools or systems, or the like. In the example illustrated in FIG. 6, the high speed communication network 327A connects with backplane 316A via the communication module 324A, whereas the high speed communication network 327B connects the communication module 324B with communication modules 324C and 324D in rack 312B. The processor module 326 processes information provided by the communication modules 324A and 324B and the I/O modules 320 according to a stored control program or routine, and provides output information to the communication module 324 and the I/O modules 320 in response to that stored program and received input messages.

Figure 7:
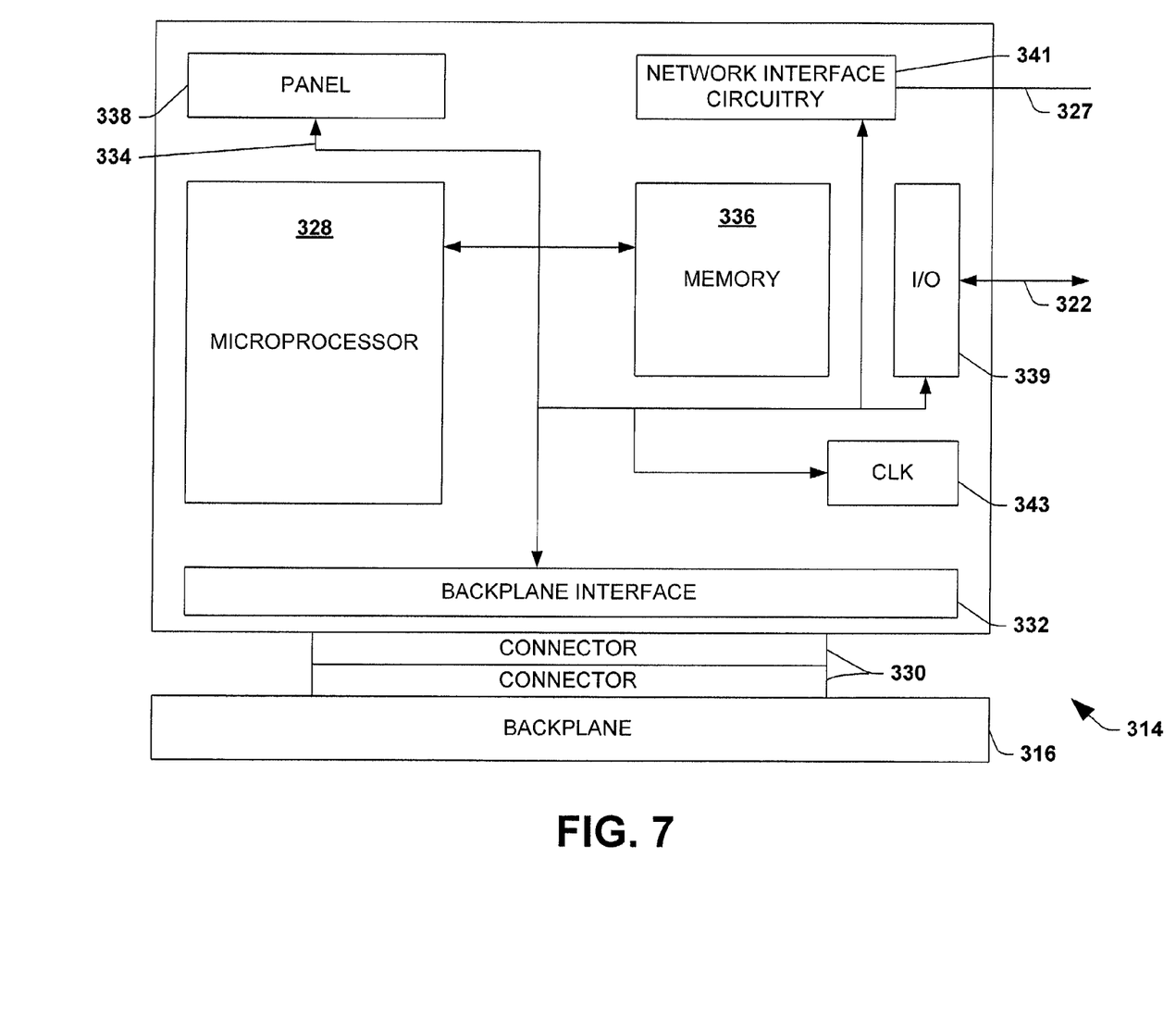
FIG. 7 is a schematic illustration of a single functional module of FIG. 6 illustrating its connection to a common backplane and communication links to communicate with other modules.

Referring also to FIG. 7, each functional module 314, is attached to the backplane 316 by means of a separable electrical connector 330 that permits the removal of the module 314 from the backplane 316 so that it may be replaced or repaired without disturbing the other modules 314. The backplane 316 provides the module 314 with both power and a communication channel to the other modules 314. Local communication with the other modules 314 through the backplane 316 is accomplished by means of a backplane interface 332 which electrically connects the backplane 316 through connector 330. The backplane interface 332 monitors messages on the backplane 316 to identify those messages intended for the particular module 314, based on a message address being part of the message and indicating the message destination. Messages received by the backplane interface 332 are conveyed to an internal bus 334 in the module 314.

The internal bus 334 joins the backplane interface 332 with a memory 336, a microprocessor 328, front panel circuitry 338, I/O interface circuitry 339 (if the module is an I/O module 320) and communication network interface circuitry 341 (if the module is a communication module 324). The microprocessor 328 may be a general purpose microprocessor providing for the sequential execution of instructions included within the memory 336 and the reading and writing of data to and from the memory 336 and the other devices associated with the internal bus 334. The microprocessor 328 includes an internal clock circuit (not shown) providing the timing of the microprocessor 328 but may also communicate with an external clock 343 of improved precision. This clock 343 may be a crystal controlled oscillator or other time standard including a radio link to an external time standard. The precision of the clock 343 may be recorded in the memory 336 as a quality factor. The panel circuitry 338 includes status indication lights such as are well known in the art and manually operable switches such as for locking the module 314 in the off state.

The memory 336 may comprise control programs or routines executed by the microprocessor 328 to provide control functions, as well as variables and data necessary for the execution of those programs or routines. For I/O modules 320, the memory 336 may also include an I/O table holding the current state of inputs and outputs received from and transmitted to the industrial controller 310 via the I/O modules 320. The module 314 may be adapted to perform the various methodologies of the invention, via hardware configuration techniques and/or by software programming techniques.

Exemplary Operating Environment

The methods and systems of the present invention may further be employed in association with many forms of computer systems. For example, the execution order generator and the methods for generating function block execution ordering may be implemented in a computer system, for example, in association with a controller configuration application or tool. In order to provide context for the various applications in which the aspects of the invention may be carried out, an exemplary computer system is now illustrated and described with respect to FIG. 8. However, it will be appreciated that the various aspects of the invention may be employed in association with computers and computer systems other than those illustrated and described herein. Although the execution order generation and other aspects of the invention have been described above in the general context of software tools and computer-executable instructions of a computer program that runs on a computer and/or computers, those skilled in the art will recognize that the invention also may be implemented in combination with other program modules.

Program modules in this regard may include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

Figure 8:
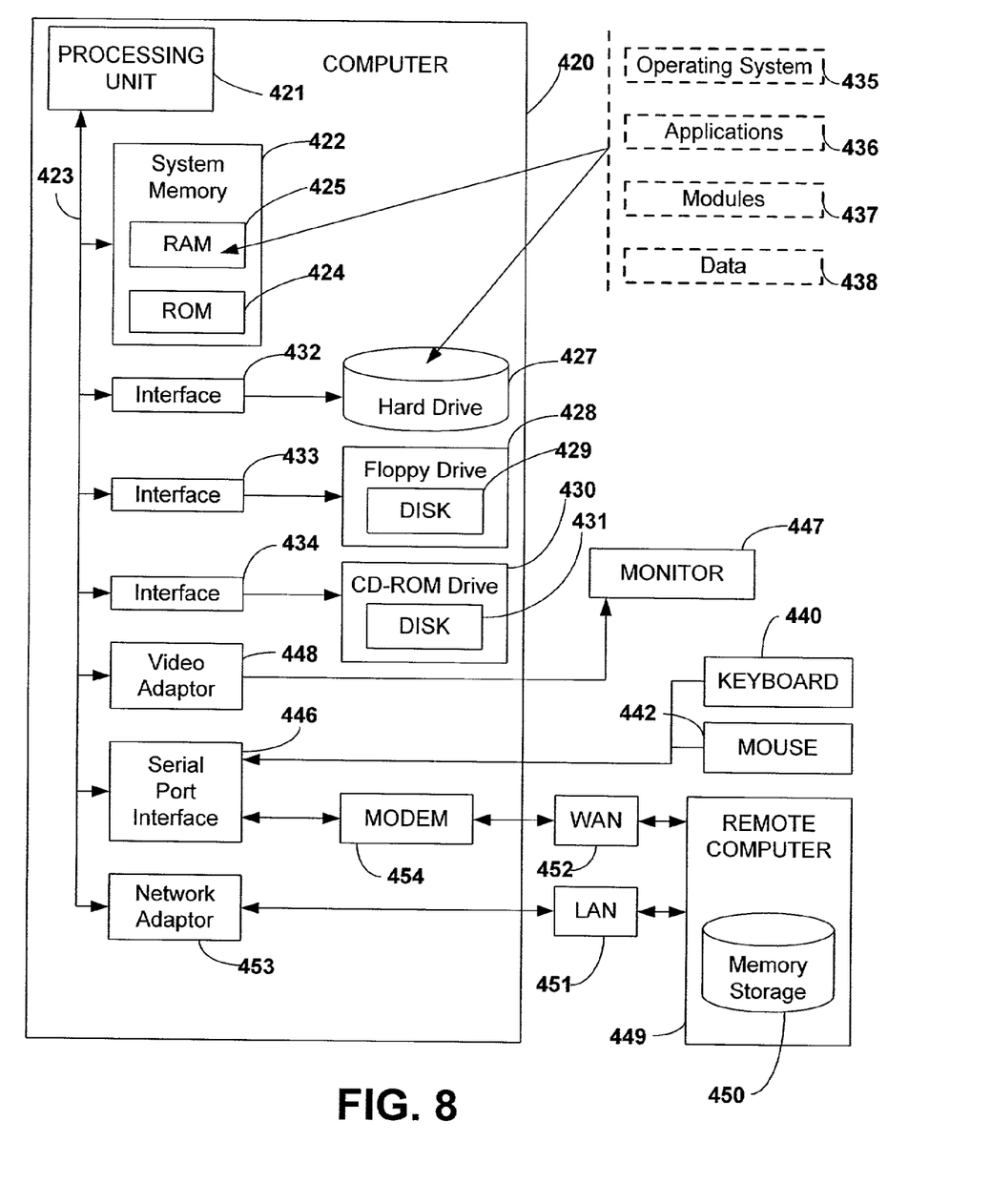
FIG. 8 is a schematic diagram illustrating an exemplary operating environment in which one or more aspects of the invention may be implemented.

With reference to FIG. 8, an exemplary environment for implementing various aspects of the invention includes a conventional personal or server computer 420, including a processing unit 421, a system memory 422, and a system bus 423 that couples various system components including the system memory to the processing unit 421. The processing unit 421 may be any of various commercially available processors. Dual microprocessors and other multi-processor architectures also can be used as the processing unit 421. The system bus 423 may be any of several types of bus structure including a memory bus or memory controller, a peripheral bus, and a local bus using any of a variety of conventional bus architectures. The computer memory may include read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the computer 420, including for the storage of broadcast programming in a suitable digital format.

Although the description of computer-readable media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention. A number of program modules may be stored in the drives and RAM 425, including an operating system 435, one or more application programs 436, other program modules 437, and program data 438.

A user may enter commands and information into the computer 420 through a keyboard 440 and a pointing device, such as a mouse 442. Other input devices (not shown) may include a microphone, an IR remote control, a joystick, a game pad, a satellite dish, a scanner, or the like. These and other input devices are often connected to the processing unit 421 through a serial port interface 446 that is coupled to the system bus 423, but may be connected by other interfaces, such as a parallel port, a game port, a universal serial bus ("USB"), an IR interface, etc. A monitor 447 or other type of display device is also connected to the system bus 423 via an interface, such as a video adapter 448. In addition to the monitor, a computer typically includes other peripheral output devices (not shown), such as speakers, printers etc.

The computer 420 may operate in a networked environment using logical connections to one or more remote computers, such as a remote computer(s) 449. The remote computer(s) 449 may be a workstation, a server computer, a router, a personal computer, microprocessor based entertainment appliance (e.g., a WebTV client system), a peer device or other common network node, and typically includes many or all of the elements described relative to the computer 420, although, for purposes of brevity, only a memory storage device 450 is illustrated. The logical connections depicted include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the computer 420 typically includes a modem 454, or is connected to a communications server on the LAN, or has other means for establishing communications over the WAN 452, such as the Internet. The modem 454, which may be internal or external, is connected to the system bus 423 via the serial port interface 446. In a networked environment, program modules depicted relative to the computer 420, or portions thereof, may be stored in the remote memory storage device 450. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention. As used in this application, the term "component" may refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component. In this regard, it will also be recognized that the invention includes a system as well as a computer-readable medium having computer-executable instructions for performing the steps of the various methods of the invention.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. In this regard, it will also be recognized that the invention includes a system as well as a computer-readable medium having computer-executable instructions for performing the steps of the various methods of the invention. In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A computer-implemented method for generating an execution order for a function block diagram having a plurality of function blocks, the function blocks each have one or more inputs, the method comprising:
    associating an input of a first function block and a second function block;
    determining input data availability for the inputs of the plurality of function blocks by determining that data is available for the input of the first function block upon detecting that an execution order number has been assigned to the second function block;
    automatically assigning respective execution order numbers to the plurality of function blocks in the function block diagram based in part upon a determination of whether an input data source is derived from a controlled process and whether the input data source is part of a feedback loop;
    determining presence of an unnecessary feedback loop in the function block diagram; and
    reporting an error to a user based at least in part upon determining that an unnecessary feedback loop exists in the function block diagram.

2. The method of claim 1, determining input data availability for the inputs of the plurality of function blocks comprises:
    determining that a feedback loop exists in the function block diagram; and
    assuming data availability for function blocks in the feedback loop.

3. The method of claim 2, determining that the feedback loop exists in the function block diagram comprises determining whether a feedback wire is associated with a function block input in the feedback loop, and wherein assuming data availability for function blocks in the feedback loop comprises assuming data availability for the function block input associated with the feedback wire.

4. The method of claim 1, determining whether an unnecessary feedback loop exists comprises determining that an unspecified feedback loop exists upon detecting that no feedback wire exists in the feedback loop.

5. The method of claim 4, determining input data availability comprises determining whether an extra feedback wire exists in the function block diagram, and generating an error if an extra feedback wire exists in the function block diagram.

6. The method of claim 1, determining input data availability for the inputs of the plurality of function blocks comprises assuming data availability for a first input of a first function block if the first input is associated with an input reference.

7. The method of claim 6, generating an execution order for the function block diagram comprises assigning an execution number to each of the plurality of function blocks in the function block diagram.

8. The method of claim 7, the function block diagram comprises an association between the first input of the first function block and a second function block, and wherein determining data availability for the plurality of function blocks comprises determining that data is available for the first input of the first function block if an execution order number has been assigned to the second function block.

9. The method of claim 7, assigning an execution number to each of the plurality of function blocks comprises assigning a next available execution order number to the first function block if data is available for all inputs of the first function block.

10. In a controller configuration system, a computer-implemented method for generating a control routine from a function block diagram having a plurality of function blocks, the function blocks each have one or more inputs, the method comprising:
  determining input data availability for the inputs of the plurality of function blocks by assuming data availability for a first input of a first function block based in part upon determining that the first input is associated with an input reference;
  automatically assigning next available execution order numbers to respective function blocks in the function block diagram based at least in part upon determining whether data is available for inputs of the first function block;
  determining that an unnecessary feedback loop exists in the function block diagram upon detecting absence of a feedback wire in the feedback loop;
  reporting an error to a user upon determining that an unnecessary feedback loop exists in the function block diagram; and
  generating a control routine from the function block diagram according to the execution order.

11. The method of claim 10, determining input data availability for the inputs of the plurality of function blocks comprises:
  determining that a feedback loop exists in the function block diagram; and
  assuming data availability for function blocks in the feedback loop.

12. The method of claim 11, determining that the feedback loop exists in the function block diagram comprises determining whether a feedback wire is associated with a function block input in the feedback loop, and wherein assuming data availability for function blocks in the feedback loop comprises assuming data availability for the function block input associated with the feedback wire.

13. The method of claim 10, determining input data availability comprises determining whether an extra feedback wire exists in the function block diagram, and generating an error if an extra feedback wire exists in the function block diagram.

14. The method of claim 10, further comprising assigning an execution number to each of the plurality of function blocks in the function block diagram.

15. The method of claim 14, the function block diagram comprises an association between an input of a first function block and a second function block, and wherein determining data availability for the plurality of function blocks comprises determining that data is available for the input of the first function block if an execution order number has been assigned to the second function block.

16. The method of claim 10, the function block diagram comprises an association between the first input of the first function block and a second function block, and wherein determining data availability for the plurality of function blocks comprises determining that data is available for the first input of the first function block if an execution order number has been assigned to the second function block.

17. A computer-implemented controller configuration system for generating a control routine from a function block diagram having a plurality of function blocks, the function blocks each have one or more inputs, the system comprising:
  an execution order generator component that determines input data availability for the inputs of the plurality of function blocks based at least in part upon detection of an extra feedback wire in the function block diagram, and assigns next available execution order numbers to the function blocks in the function block diagram, the execution order generator component assigns an execution order number to at least a first function block based at least in part upon determining whether data is available for inputs of the at least first function block, an extra the execution order generator component further reports an error to a user via a display based at least in part upon detection of an extra feedback wire in the function block diagram; and
  a compiler component that generates a control routine from the function block diagram according to the execution order.

18. A computer-implemented execution order generator for generating an execution order for a function block diagram having a plurality of function blocks, the function blocks each have one or more inputs, the execution order generator comprising:
  means for determining input data availability of at least a first function block upon assigning an execution order number to a second function block;
  means for automatically assigning an execution order number to each of a plurality of function blocks based at least in part upon whether the input data source is part of a feedback loop;
  means for determining whether an unnecessary feedback loop exists in the function block diagram; and
  means for reporting an error to a user upon determining that an unnecessary feedback loop exists in the function block diagram.

* * * * *